US012160348B1

(12) United States Patent
Yelahanka Raghuprasad et al.

(10) Patent No.: US 12,160,348 B1
(45) Date of Patent: Dec. 3, 2024

(54) ESTIMATING THE NEED FOR USER FEEDBACK IN TRAINING MULTI-APPLICATION QOE MODELS

(71) Applicant: Cisco Technology, Inc., San Jose, CA (US)

(72) Inventors: Mukund Yelahanka Raghuprasad, San Jose, CA (US); Jean-Philippe Vasseur, Combloux (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/198,553

(22) Filed: May 17, 2023

(51) Int. Cl.
 *G06F 15/173* (2006.01)
 *H04L 41/16* (2022.01)
 *H04L 43/50* (2022.01)

(52) U.S. Cl.
 CPC ............. *H04L 41/16* (2013.01); *H04L 43/50* (2013.01)

(58) Field of Classification Search
 CPC ............................... H04L 41/16; H04L 43/50
 USPC .................................................. 709/223–224
 See application file for complete search history.

(56) References Cited

U.S. PATENT DOCUMENTS

| 8,341,196 B2 * | 12/2012 | Immonen | G06F 16/29 707/688 |
|---|---|---|---|
| 10,326,848 B2 | 6/2019 | Nath et al. | |
| 10,762,206 B2 | 9/2020 | Titonis et al. | |
| 11,429,405 B2 * | 8/2022 | Daianu | H04L 51/52 |
| 2016/0065419 A1 * | 3/2016 | Szilagyi | H04L 43/10 709/224 |
| 2021/0097545 A1 * | 4/2021 | Laptiev | G06Q 20/24 |
| 2022/0300392 A1 * | 9/2022 | Biswas | G06F 11/3438 |
| 2022/0303822 A1 | 9/2022 | Kotecha et al. | |
| 2022/0353181 A1 | 11/2022 | Vasseur et al. | |

OTHER PUBLICATIONS

Seufert, et al., "Considering User Behavior in the Quality of Experience Cycle: Towards Proactive QoE-aware Traffic Management", IEEE Communications Letters, Apr. 2019, 5 pages.

* cited by examiner

*Primary Examiner* — Bharat Barot
(74) *Attorney, Agent, or Firm* — BEHMKE INNOVATION GROUP LLC; James M. Behmke; James J. Wong

(57) ABSTRACT

In one embodiment, a device identifies a plurality of online applications accessible via a network for which a prediction model was trained to predict their application experiences. The device makes a determination as to whether a particular online application is behaviorally similar to any of the plurality of online applications. The device obtains, based on the determination, application experience metrics for the particular online application, when the particular online application is not behaviorally similar to any of the plurality of online applications. The device trains, using the application experience metrics for the particular online application, the prediction model to predict an application experience of the particular online application in addition to those of the plurality of online applications, when the particular online application is not behaviorally similar to any of the plurality of online applications.

20 Claims, 12 Drawing Sheets

ESTIMATING THE NEED FOR USER FEEDBACK IN TRAINING MULTI-APPLICATION QOE MODELS

TECHNICAL FIELD

The present disclosure relates generally to computer networks, and, more particularly, to estimating the need for user feedback in training multi-application quality of experience (QoE) models.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments.

Directly modeling the QoE of one or more applications is also possible, but requires the collection of user feedback (e.g., labels) for purposes of training. However, repeating this process each time a new application is added can be quite time consuming and resource intensive.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
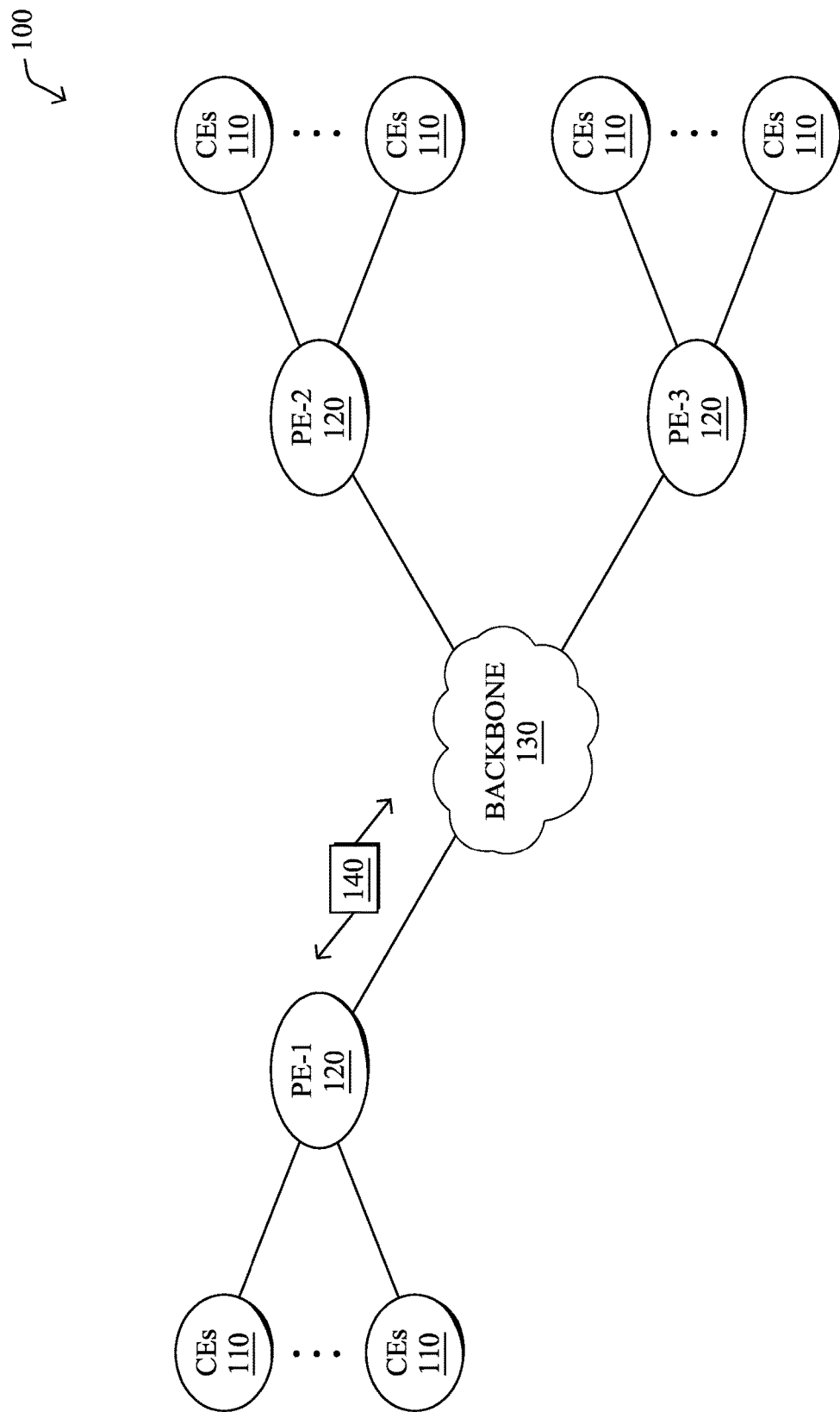
FIGS. 1A-1B illustrate an example communication network.

According to one or more embodiments of the disclosure, a device identifies a plurality of online applications accessible via a network for which a prediction model was trained to predict their application experiences. The device makes a determination as to whether a particular online application is behaviorally similar to any of the plurality of online applications. The device obtains, based on the determination, application experience metrics for the particular online application, when the particular online application is not behaviorally similar to any of the plurality of online applications. The device trains, using the application experience metrics for the particular online application, the prediction model to predict an application experience of the particular online application in addition to those of the plurality of online applications, when the particular online application is not behaviorally similar to any of the plurality of online applications.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
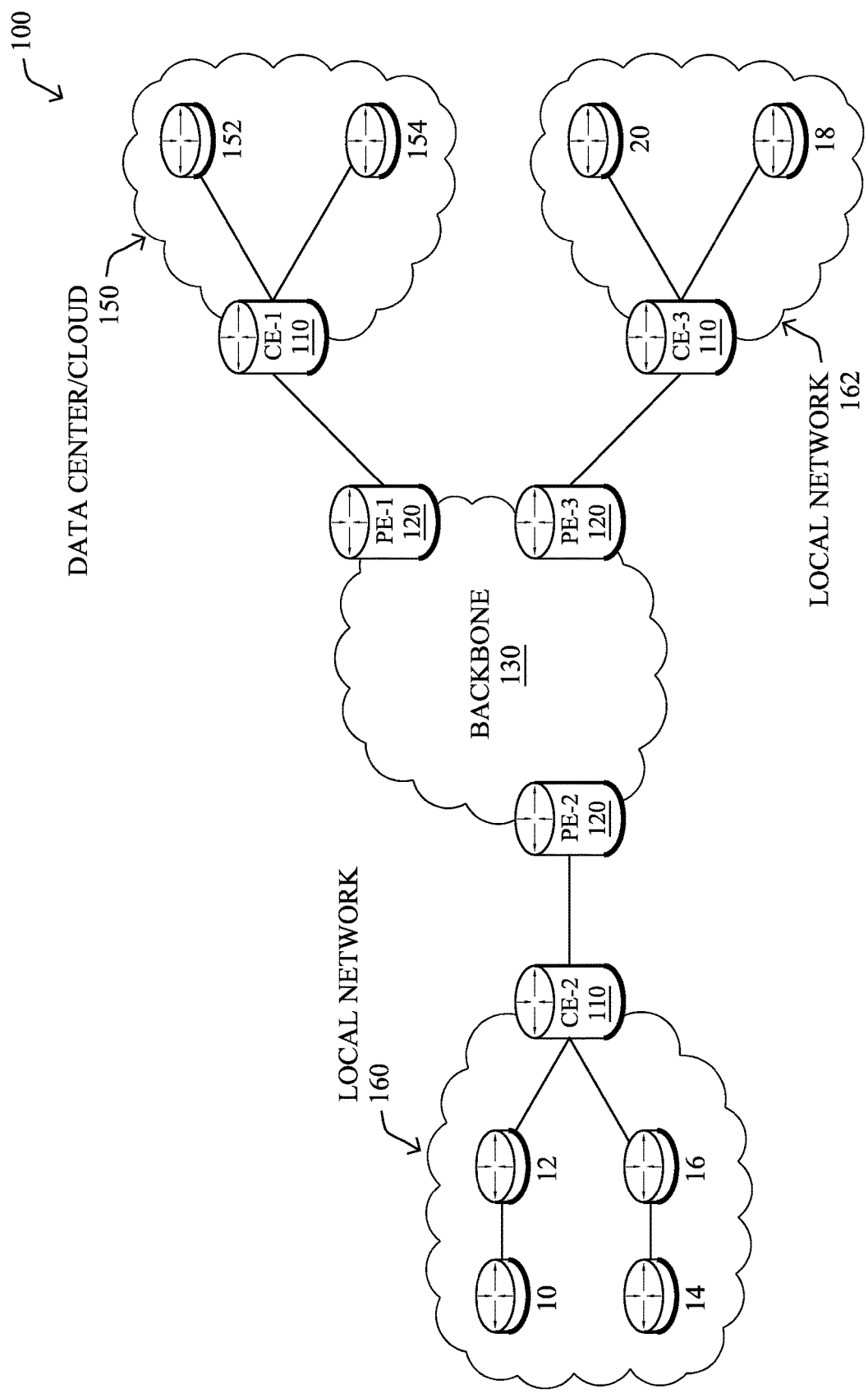

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
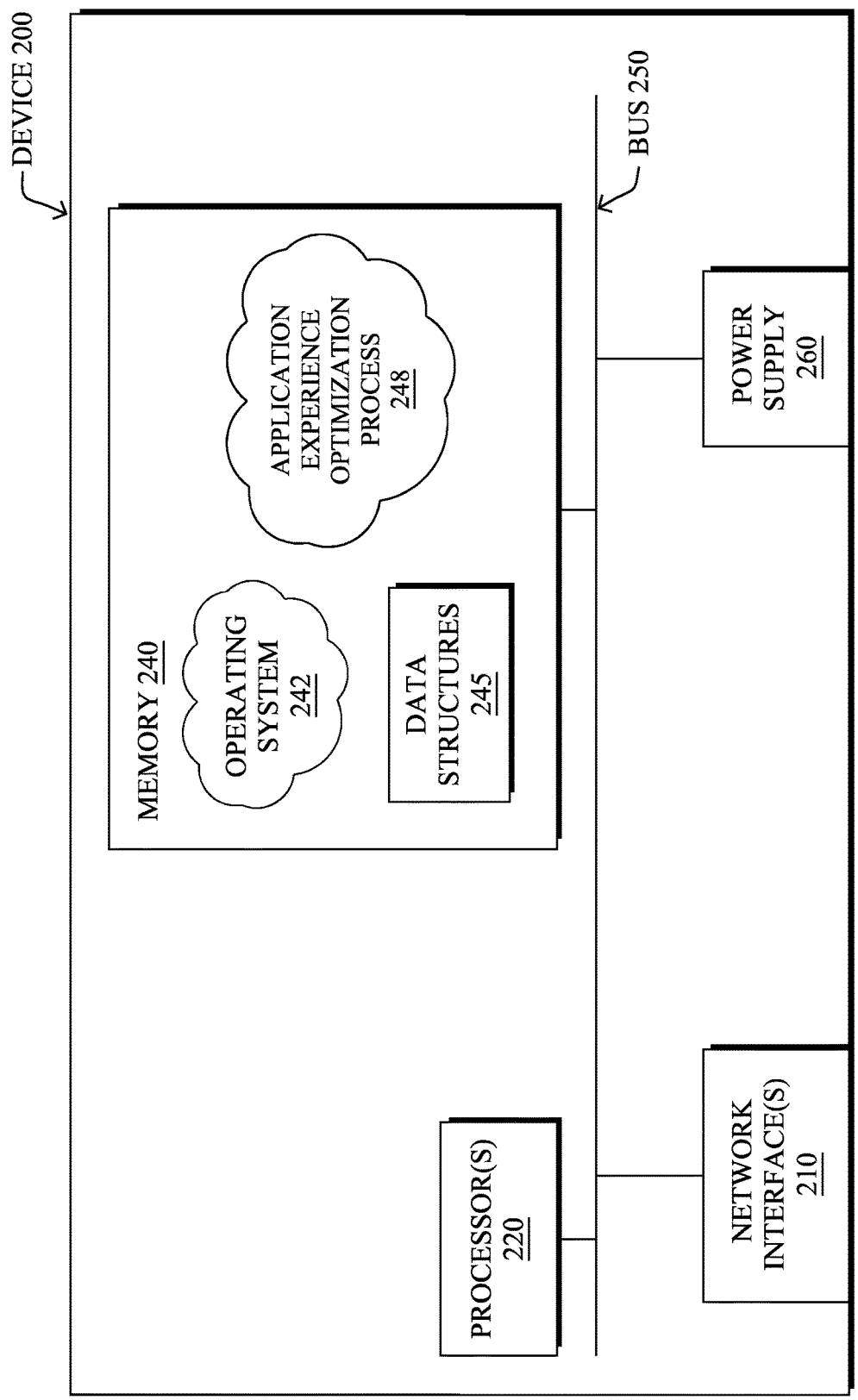
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
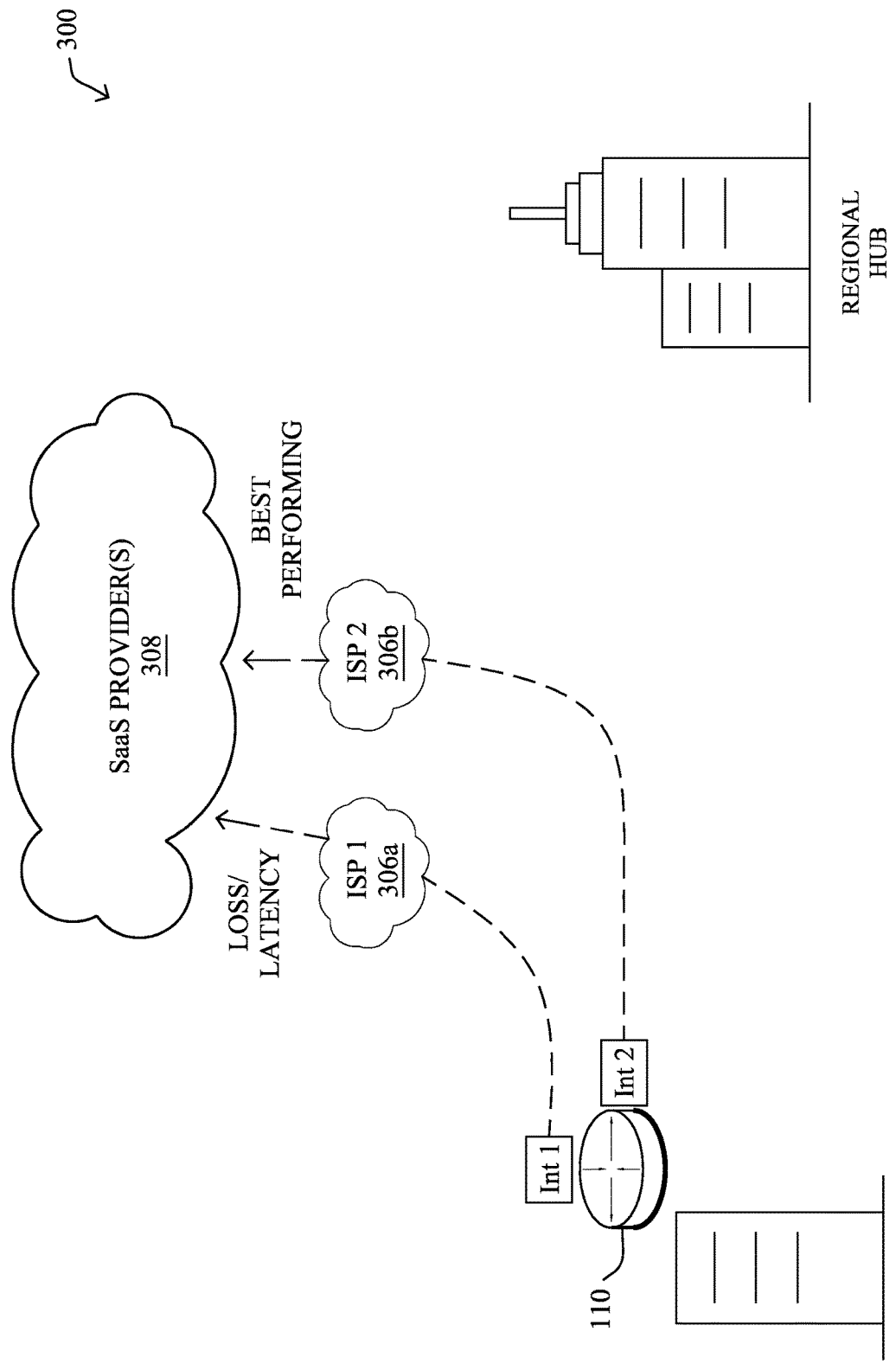
FIGS. 3A-3B illustrate example network deployments.
Figure 3B:
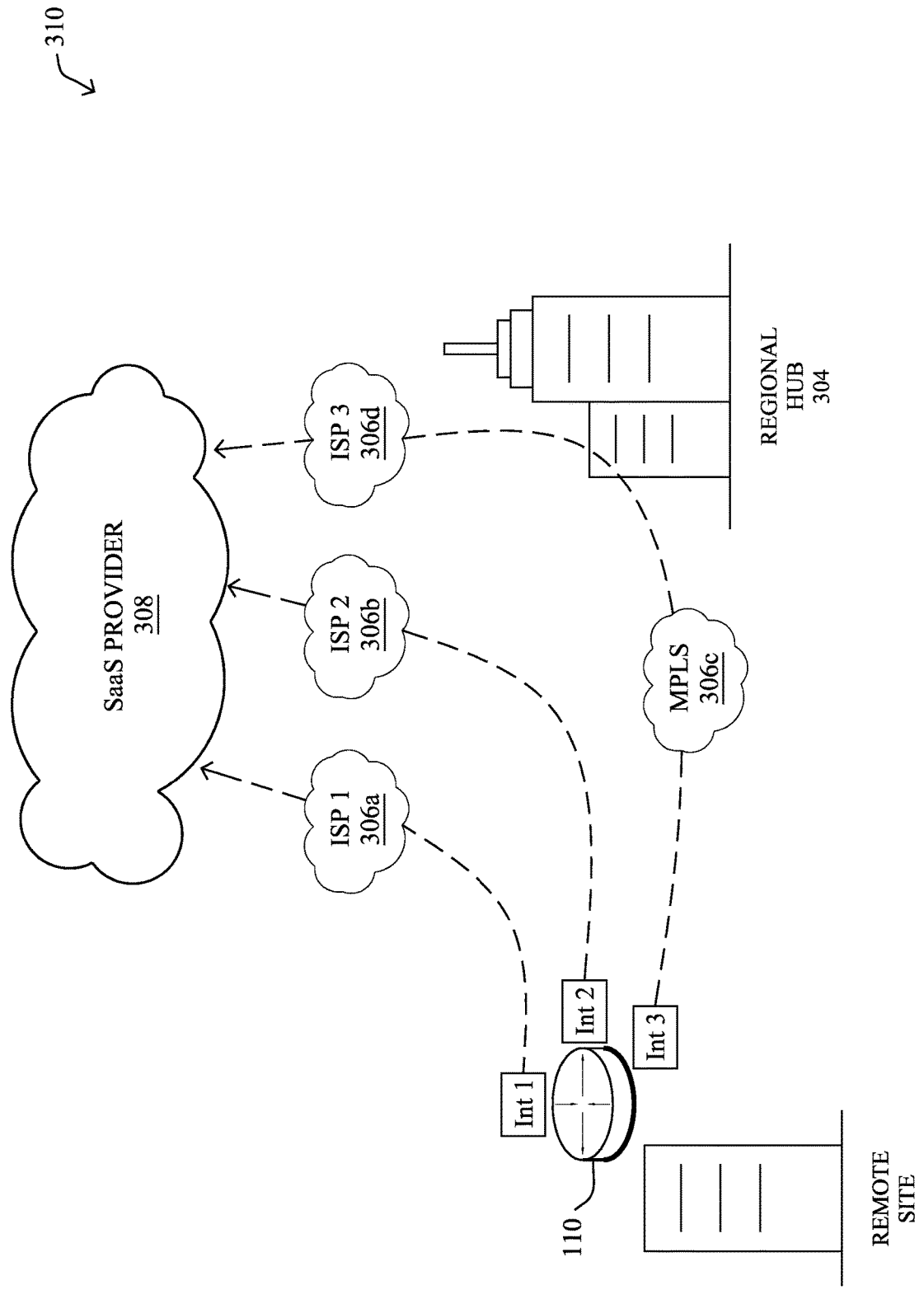

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
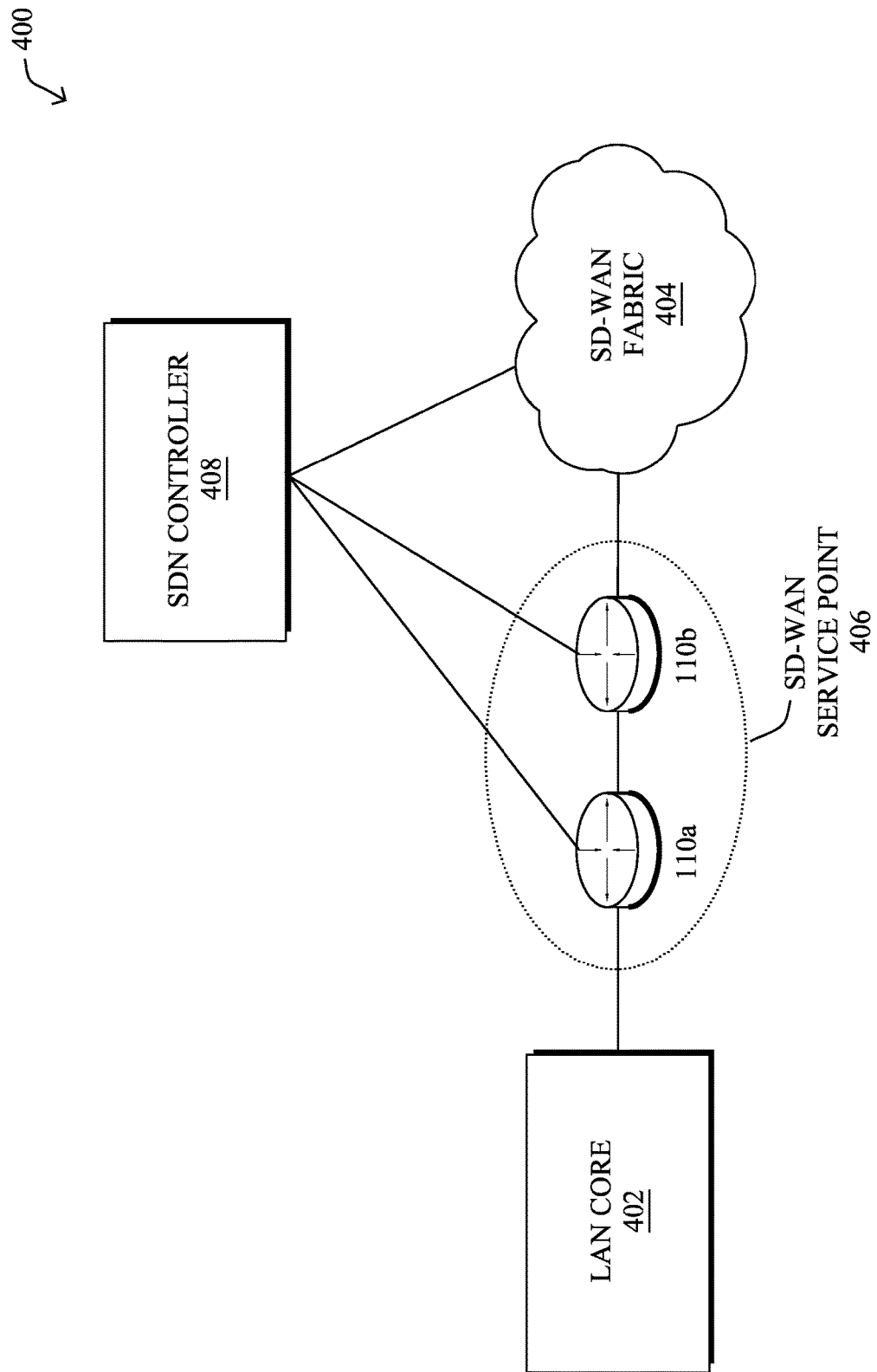
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela. CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
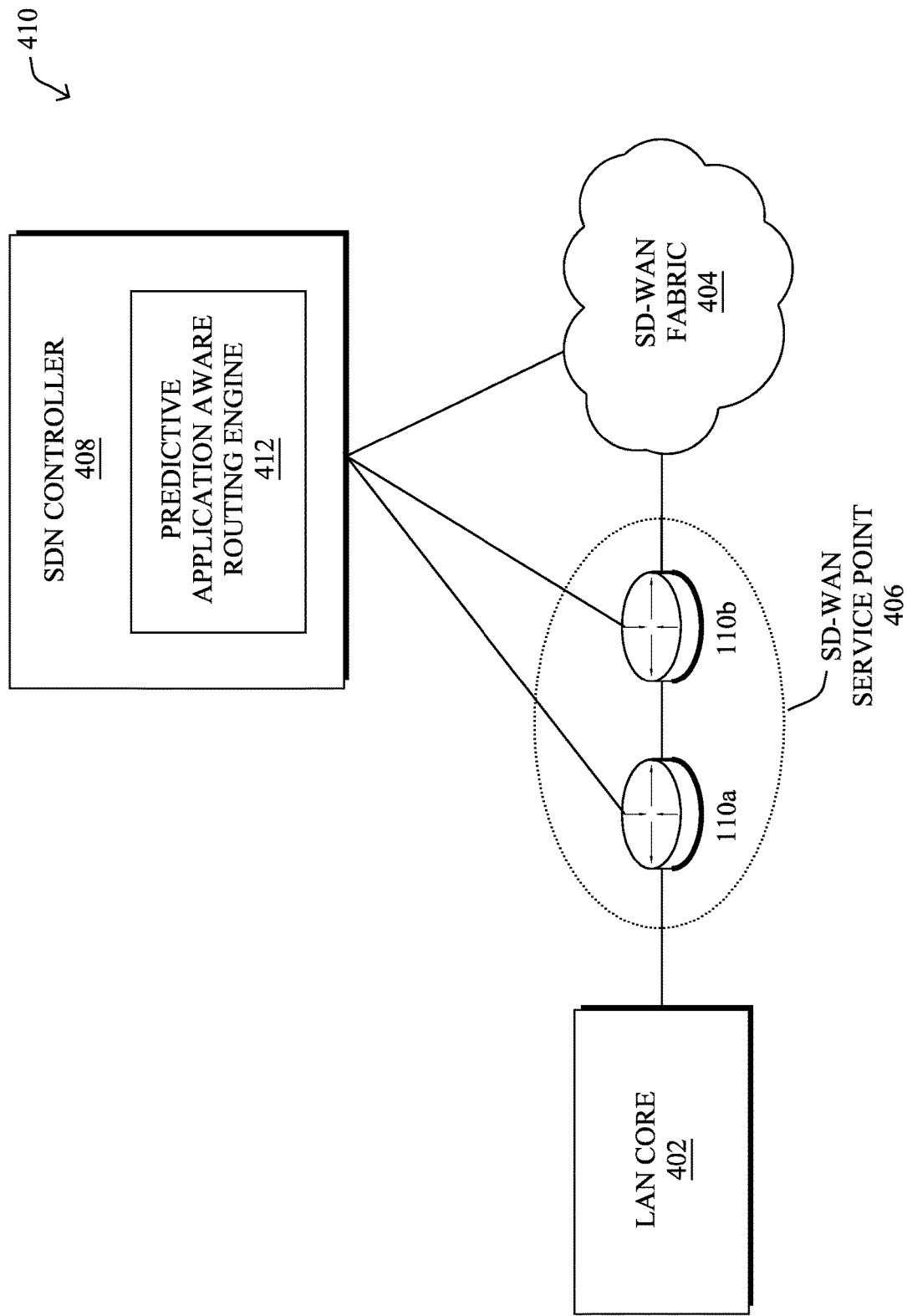

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

As noted above, multi-application QoE models are now possible to predict the user experience for various applications through the same machine learning model. However, training such models can require a supervised dataset with user experience labels from across all of the target application domains. However, acquiring such supervised datasets for all target applications can be expensive and time consuming in nature. In some embodiments, given the labeled datasets of a few seed applications, the system could also employ approaches like Domain Adaptation to produce QoE estimates for a new target application without the requirement of new labels. Generally, Domain Adaptation utilizes the similarity of behavior in the seed vs. new applications to produce QoE estimates for the new application without any application specific labels. Even so, when the behavior of the new application is extremely different compared to the seed application, techniques like domain adaptation still tend to fail.

Estimating the Need for User Feedback in Multi-Application QoE Models

The techniques introduced herein estimate whether a new target application being onboarded requires the collection of user feedback labels for a multi-application model to produce accurate QoE estimates. In some aspects, the system does so by analyzing the similarity (or lack thereof) in application behavior for various applications under similar underlying conditions. A similar application behavior between the seed applications and the new application would imply that the behavior of the new application is already captured by the multi-application model and would not require additional supervised training. Once the requirement for new labels is established, the system can also identify the specific cases/impairment scenarios for which the new application labels would need to be collected. Such visibility into the specific cases that require labels would help the user prioritize and save cost/time involved in label acquisition.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device identifies a plurality of online applications accessible via a network for which a prediction model was trained to predict their application experiences. The device makes a determination as to whether a particular online application is behaviorally similar to any of the plurality of online applications. The device obtains, based on the determination, application experience metrics for the particular online application, when the particular online application is not behaviorally similar to any of the plurality of online applications. The device trains, using the application experience metrics for the particular online application, the prediction model to predict an application experience of the particular online application in addition to those of the plurality of online applications, when the particular online application is not behaviorally similar to any of the plurality of online applications.

Figure 5:
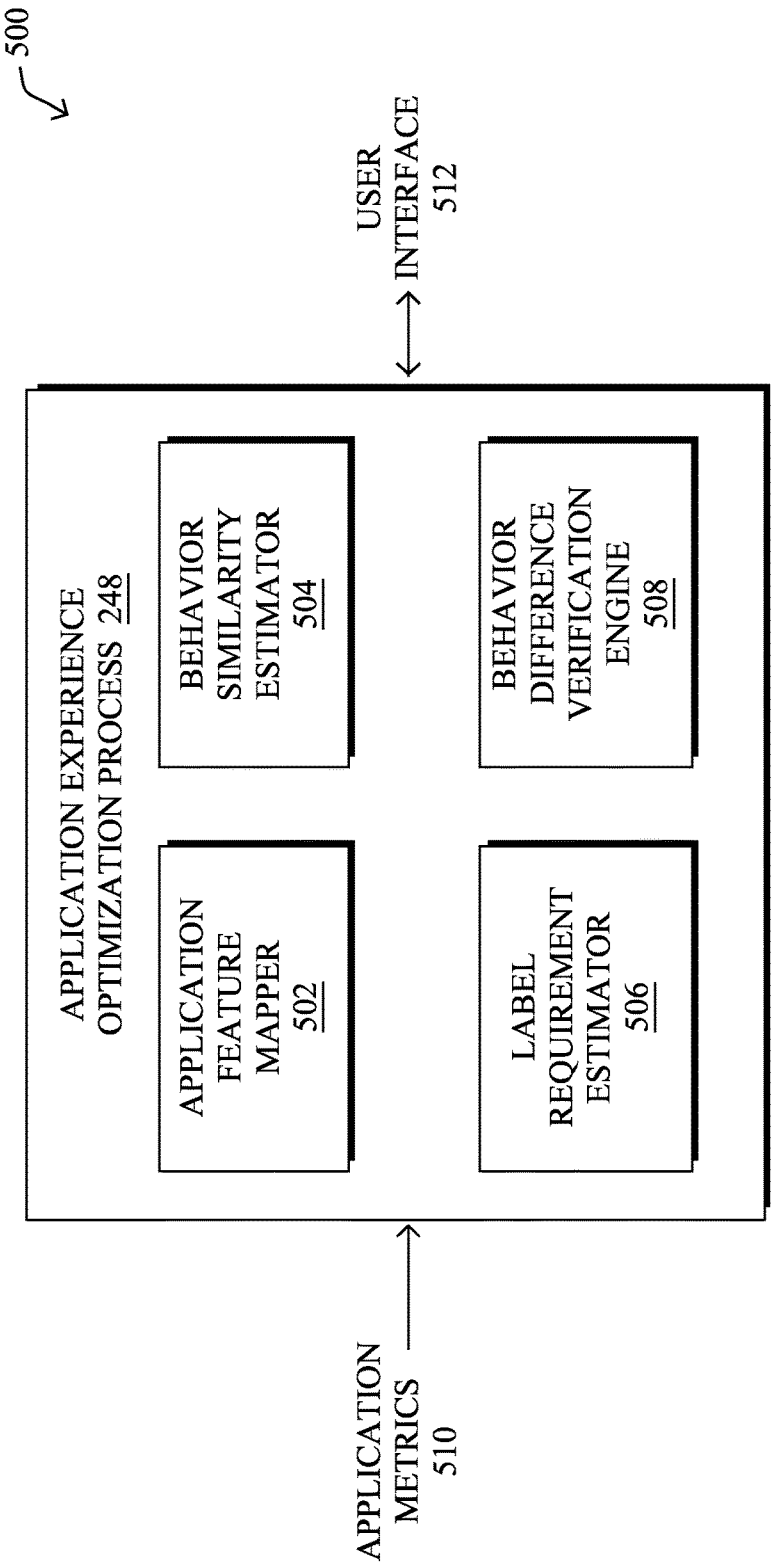
FIG. 5 illustrates an example architecture for estimating the need for user feedback in training multi-application quality of experience (QoE) models.

Operationally, FIG. 5 illustrates an example architecture for estimating the need for user feedback in training multi-application QoE models, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network.

As shown, application experience optimization process 248 may include any or all of the following components: application feature mapper 502, behavior similarity estimator 504, label requirement estimator 506, and/or behavior difference verification engine 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

According to various embodiments, as detailed below, application feature mapper 502 may take as input the various application datasets (labeled and/or unlabeled), standardizes them, and associates the set of common metrics between the applications. Behavior similarity estimator 504 then takes these standardized application datasets and studies the set of common application-level metrics to estimate the level of similarity between applications. Label requirement estimator 506 then takes in as input the information computed previously and provides the user with information on the similarity of behavior between the new target application and the set of seed applications. It may also estimate the specific scenarios that might require label collection and can initiate the label collection process. Finally, behavior difference verification engine 508 may verify that the scenarios identified by label requirement estimator 506 do indeed cause variation in application behavior. It may also pass the results of these verification tests back to the previous components to improve/update the system.

During execution, application feature mapper 502 may collect application metrics 510 for the various applications supported by the multi-application QoE prediction model.

These metrics may be provided in the granularity of the raw application data. First, application feature mapper 502 may associate those metrics that are equivalent with each other across applications and creates a set of common metrics. For example, in video collaborative applications the set of common metrics across different applications could include metrics like Video Framerate, Video Frame Resolution, Media Bitrate, etc. In one embodiment such mappings can be created by the user or application feature mapper 502 could automatically study the metric metadata and associate the equivalent metrics with their mappings. Application feature mapper 502 may further perform the necessary preprocessing required on the metrics to convert them to a standard scale, granularity, or unit of measurement. Example pre-processing steps could include, for instance, any or all of the following: converting the application reports of various granularities to a single granularity, performing derivations on metrics to arrive at a standard unit for that metric, combining a set of metrics through aggregations to create an equivalent metric across applications, etc.

Application datasets may not necessarily be collected across the same set of users or be associated to the same underlying conditions. In one embodiment, application feature mapper 502 could also filter only those records from the datasets that are associated to common underlying factors across the applications. The example underlying factors could be network impairment scenarios, user location, subsection of the network, etc. These factors can be input by the user or decided by application feature mapper 502, depending on the application metadata. In another embodiment, application feature mapper 502 may normalize the application metrics corresponding to different underlying factor, so as to make it feasible to compare metrics under similar conditions. In other circumstances, application feature mapper 502 may extrapolate some of the metrics so as to compare them under similar conditions.

In various embodiments, behavior similarity estimator 504 may takes as input the common application metrics from multiple applications and estimates the similarity of application behavior. In one embodiment, the similarity in application behavior can be understood by analyzing the common metrics through the Mutual Information measure (i.e., the mutual information between two variables is defined as the reduction in uncertainty about variable X given knowledge of Y, or vice versa. It is calculated using the entropy of the variables and their joint entropy). If, for a given application, the mutual information between two of its metrics is high, it implies that the two metrics are highly related to each other.

For example, in video conferencing applications, if the mutual information between the RX Packet Loss and the Video Framerate is high, it would imply that packet loss affects the framerate and that the application is vulnerable to packet loss. Behavior similarity estimator 504 may then compute such relations for all the metric pairs of an application, resulting in a mutual information matrix for all the common application-level metrics. For any two applications, studying their respective mutual information matrices can help behavior similarity estimator 504 understand the similarity in behavior between the two applications.

Figure 6:
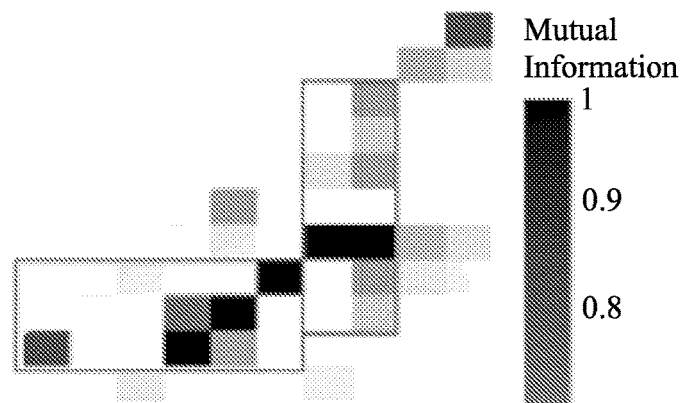
FIG. 6 illustrates an example plot comparing metrics for a seed application with a new application.
Figure 6:
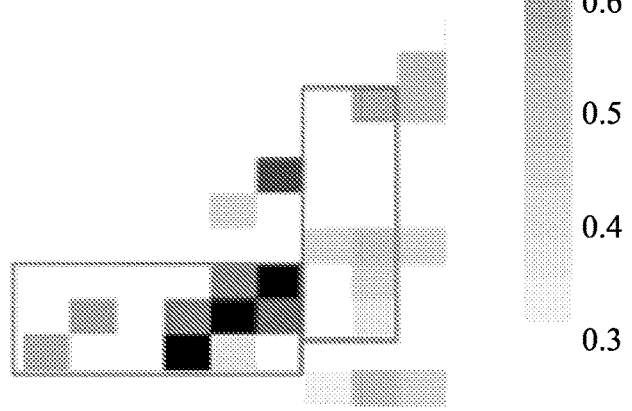

FIG. 6 illustrates an example plot 600 comparing metrics for a seed application with a new application, in various embodiments. As shown, plot 600 shows a mutual information matrix for two video conferencing applications A and B. Application A is the seed application that has already been trained by the QoE model, whereas application B is the new application that is being evaluated for similarity with application A. Here, the axes represent common application metrics, with the shading representing the mutual information scores between these metrics, with a higher score implying a stronger relationship between two applications. More specifically, such common application metrics may include system CPU usage, process CPU usage, video frame rate, video resolution, video packet loss, video jitter, video delay, video receive (RX) media bitrate, audio packet loss, audio jitter, audio delay, and/or audio RX media bitrate.

Note also that the upper half of the matrix has been hidden because the mutual-information matrix is a square matrix which would show the same values on the upper half of the matrix.

From plot 600, the following can be observed between the two applications:
  Audio packet loss, jitter, and delay are strongly related to Video packet loss, jitter and delay for both applications.
  The Video frame rate and video frame resolution seem to be more strongly related to packet loss, delay, jitter, and media bitrate metrics in application A, but the same is not true for application B.
  Application B has a relatively weaker relation implying some difference in application behavior between the two applications.
  This implies that the system would need to collect additional labels for application B.

Referring again to FIG. 5, in another embodiment, behavior similarity estimator 504 may encode the application-level metrics 510 of various applications into lower dimensional embeddings such that two application reports even those from different applications are encoded close to each other if they represent a similar application behavior. To do so, behavior similarity estimator 504 may encode the reports through objective functions based on Mutual Information maximization. The proximity of the various application reports within the encoded latent space provides an estimate of the similarity in application behavior.

Figure 7:
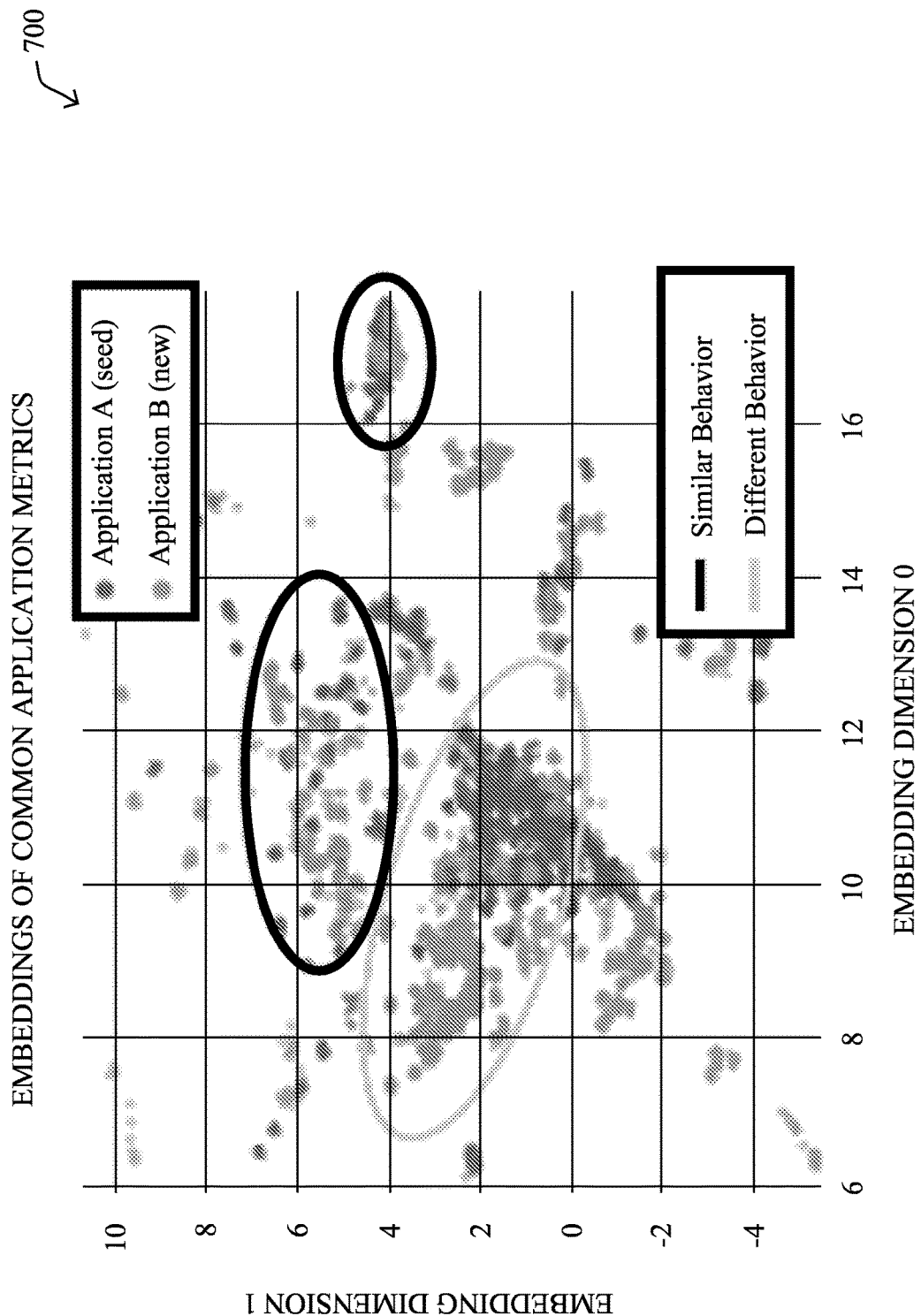
FIG. 7 illustrates an example plot of application behaviors.

FIG. 7 illustrates an example plot 700 of application behaviors taking such an approach based on a dimensionality reduction performed for the application reports of the two applications A and B mentioned previously with respect to FIG. 6. As shown, the common application metrics for both the apps are reduced in dimensionality to two-dimensional embedding space. For instance, behavior similarity estimator 504 may perform the dimensionality reduction using the Unified Manifold Approximation and Projection (UMAP) algorithm, which reduces the dimensionality of the input data such that it maintains the topological structure of the reports and thus maximizing the mutual information. Here, the X-axis of plot 700 is the Embedding Dimension 0, the Y-axis is the Embedding Dimension 1, and each point represents an application report with it shading representing the application to which it belongs.

From plot 700, it can be seen that few application reports are closely encoded and may exhibit similar application behavior, whereas a large section of the reports are also differently encoded, which implies a variation in application behavior. This shows that there are certain cases/scenarios with varying application behavior and require new labels to be collected.

Referring again to FIG. 5, label requirement estimator 506 takes as input the metrics computed by behavior similarity estimator 504 and organizes the information for a user, via user interface 512, to understand the specific cases that require label collection for the new applications. In one embodiment, label requirement estimator 506 may identify the various network impairment scenarios that affect the applications and provide a visualization that displays the behavior of all the applications under the impairments. The impairments that exhibit the most difference in application behavior can then be also prioritized for new label collection. Like behavior similarity estimator 504, label requirement estimator 506 may estimate the application behavior through a mutual-information measure. For example, if label requirement estimator 506 observes that application A has high mutual information between network delay impairments and video framerate, while application B does not, this implies that the applications behave differently under network delay impairments. In such a case, label requirement estimator 506 may then prioritize the collection of labels for users of application B who experience delay impairments.

Figure 8:
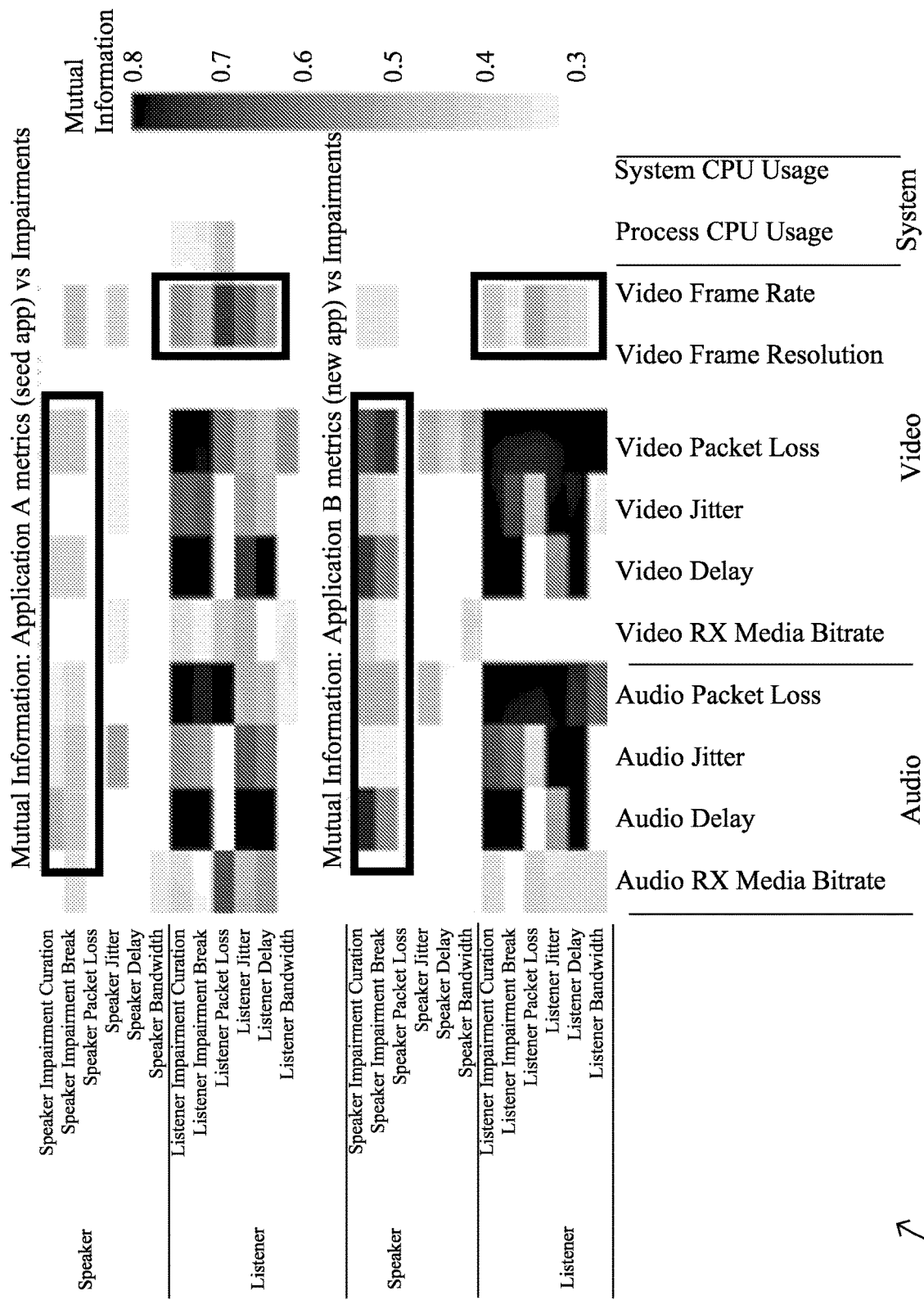
FIG. 8 illustrates an example plot comparing impairments between a seed application and a new application.

FIG. 8 illustrates an example plot 800 comparing impairments between a seed application and a new application (e.g., the same applications A and B described previously with respect to FIGS. 6-7), in various embodiments. As shown, various impairments may affect the behaviors of the applications, differently. Here, plot 800 shows the mutual information between the various network impairment metrics (level 3) with the corresponding application metrics. A high mutual information implies that the application metric changes significantly with change in a certain underlying network condition. More specifically, plot 800 shows the common application metrics vs. network impairment metrics, with the mutual information computed between these metrics and the shading representing the degree of mutual information between any two metrics.

From plot 800, it can be seen that:
- The majority of the metrics for applications A and B exhibit similar levels of mutual information when the listener side network is impaired.
- The video framerate of application A has a relatively higher information with listener side impairments compared to application B. This implies that any user of application B, experiencing listener side impairments and not having problems with framerate need to be prioritized for label collection.
- The speaker side impairments contain relatively higher information with application metrics for application B. This implies that application B is less resilient to speaker side impairments and any user of application B experiencing speaker side impairments needs to be prioritized for label collection.

Referring again to FIG. 5, in some embodiments, label requirement estimator 506 can then also initiate label collection for the specific cases/network impairment scenarios that require label collection for the new application.

In various embodiments, behavior difference verification engine 508 may verify that the specific cases or impairment scenarios that were identified by label requirement estimator 506 do indeed differ in application behavior for the end user. It is to be noted that the cases identified by the previous component are dependent on the data collected for application A and B in real-world scenarios and is not based on the "ground-truth" (e.g., user-provided feedback/QoE labels). In one embodiment, behavior difference verification engine 508 may perform the verification by simply analyzing the new user-labels collected for the various scenarios. If the user-provided feedback/labels imply a different QoE behavior between the new application and the seed application for the same underlying impairment scenario, it would mean that the system was successful. In other words, the system identified scenarios that cause differing application behavior and thus identified scenarios that require additional labelled data. Conversely, if the labels imply the same QoE behavior between the seed and new applications, it will mean that any additional label collection may not be required, and the multi-application model can provide accurate predictions for the new application without additional labelled data. This means that the label collection for the specific scenarios can then be paused. In some instances, behavior difference verification engine 508 may also provide an indication of this determination back to any or all of the other components of application experience optimization process 248, so that they can be tuned or updated, accordingly.

In another embodiment application experience optimization process 248 can also verify differing application behavior by reproducing the specific network impairment conditions between both sets of applications on a test network. To do so, the system can collect telemetry and recompute the mutual information between the application-level metrics in order to check whether the application behavior is similar under similar conditions. By reproducing the impairment scenarios under controlled conditions, application experience optimization process 248 can verify the information provided by the previous component on much cleaner telemetry. In one embodiment, such a test may entail leveraging a utility deployed to one or more nodes in the network that allows different network impairments to be reproduced. Such a test may be limited to situations where the machine learning model makes use of such variables (e.g., high weight, Shapley values, etc.).

Figure 9:
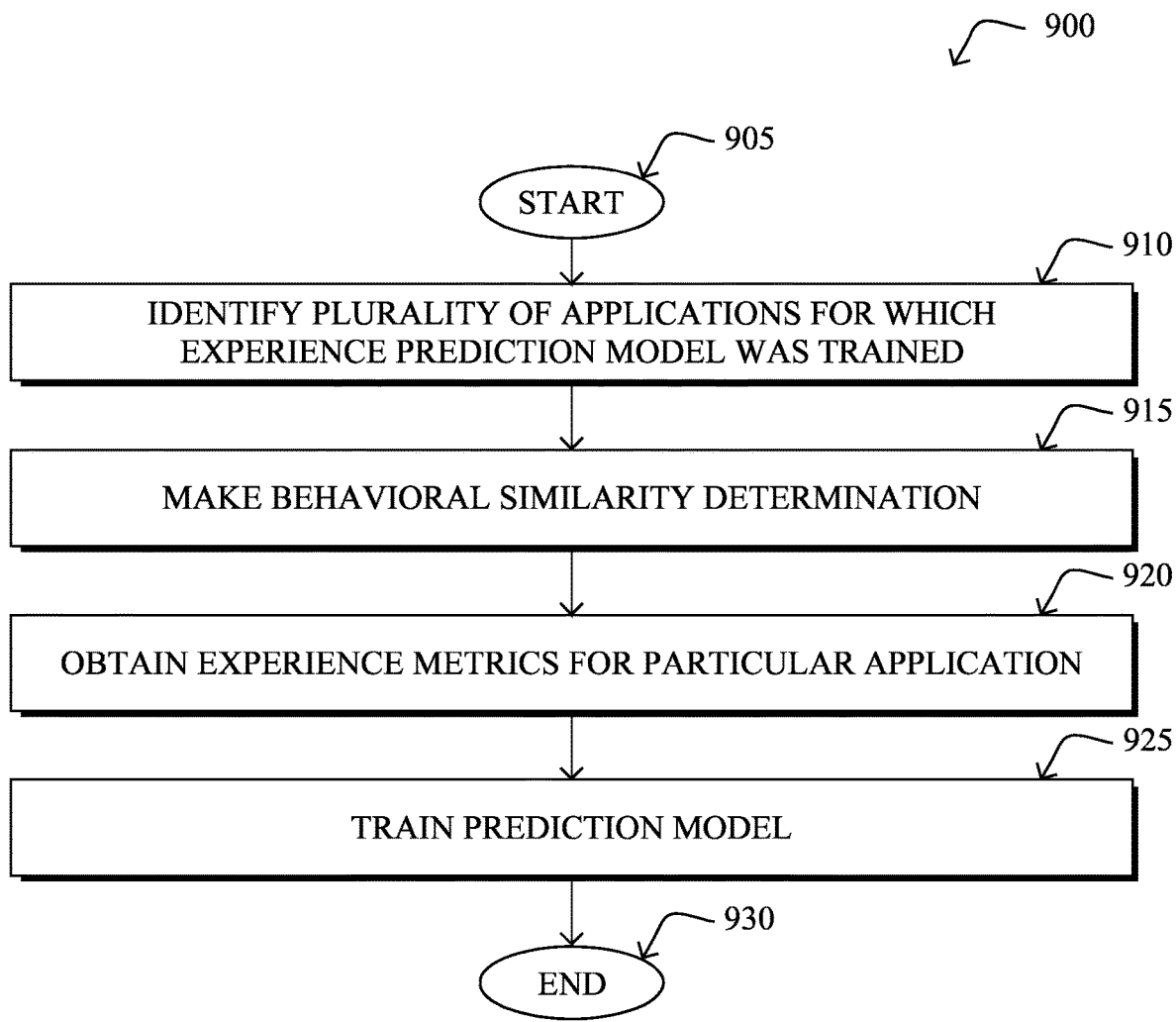
FIG. 9 illustrates an example simplified procedure for estimating the need for user feedback in training multi-application QoE models.

FIG. 9 illustrates an example simplified procedure (e.g., a method) for estimating the need for user feedback in training multi-application QoE models, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 900 by executing stored instructions (e.g., application experience optimization process 248). The procedure 900 may start at step 905, and continues to step 910, where, as described in greater detail above, the device may identify a plurality of online applications accessible via a network for which a prediction model was trained to predict their application experiences. In some embodiments, the particular online application transmits video data via the network.

At step 915, as detailed above, the device may make a determination as to whether a particular online application is behaviorally similar to any of the plurality of online applications. In some embodiments, the device may do so by computing mutual information metrics between telemetry data associated with the particular online application and telemetry data associated with each of the plurality of online applications. In various embodiments, the telemetry data associated with the particular online application comprises both Layer 3 telemetry metrics collected from the network and Layer 7 telemetry metrics collected from the particular online application. In some embodiments, the determination is based on whether the particular online application and any of the plurality of online applications react similarly to a certain type of impairment in the network.

At step 920, the device may obtain, based on the determination, application experience metrics for the particular online application, when the particular online application is not behaviorally similar to any of the plurality of online applications, as described in greater detail above. In some embodiments, the device may do so by prompting users of the particular online application to rate their experiences with the particular online application (e.g., either directly or indirectly, such as by sending a request to the application itself, to agents on clients of the application, etc.).

At step 925, as detailed above, the device may train, using the application experience metrics for the particular online application, the prediction model to predict an application experience of the particular online application in addition to those of the plurality of online applications, when the particular online application is not behaviorally similar to any of the plurality of online applications. In some embodiments, the device may also use the application experience of the particular online application predicted by the prediction model to make a routing decision with respect to traffic in the network associated with the particular online application. In further embodiments, the device may also use the prediction model to predict an application experience of a different online application than that of the particular online application and the plurality of online applications, based on a determination that the different online application is not behaviorally similar to that of the particular online application nor any of the plurality of online applications. In another embodiment, the device may also train the prediction model to specifically predict the application experience of the different online application using application experience metrics obtained for the different online application, based on a difference between the application experience of the different online application predicted by the prediction model and the application experience metrics obtained for the different online application. In one embodiment, the device may also initiate an impairment test in the network to confirm whether the particular online application is behaviorally similar to any of the plurality of online applications.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for estimating the need for user feedback in training multi-application QoE models, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    identifying, by a device, a plurality of online applications accessible via a network for which a prediction model was trained to predict their application experiences;
    making, by a device, a determination as to whether a particular online application is behaviorally similar to any of the plurality of online applications;
    obtaining, by the device and based on the determination, application experience metrics for the particular online application, when the particular online application is not behaviorally similar to any of the plurality of online applications; and
    training, by the device and using the application experience metrics for the particular online application, the prediction model to predict an application experience of the particular online application in addition to those of the plurality of online applications, when the particular online application is not behaviorally similar to any of the plurality of online applications.

2. The method as in claim 1, further comprising:
    using, by the device, the application experience of the particular online application predicted by the prediction model to make a routing decision with respect to traffic in the network associated with the particular online application.

3. The method as in claim 1, wherein making the determination as to whether the particular online application is behaviorally similar to any of the plurality of online applications comprises:
    computing mutual information metrics between telemetry data associated with the particular online application and telemetry data associated with each of the plurality of online applications.

4. The method as in claim 3, wherein the telemetry data associated with the particular online application comprises both Layer 3 telemetry metrics collected from the network and Layer 7 telemetry metrics collected from the particular online application.

5. The method as in claim 1, further comprising:
    using, by the device, the prediction model to predict an application experience of a different online application than that of the particular online application and the plurality of online applications, based on a determination that the different online application is not behaviorally similar to that of the particular online application nor any of the plurality of online applications.

6. The method as in claim 5, further comprising:
    training the prediction model to specifically predict the application experience of the different online application using application experience metrics obtained for the different online application, based on a difference between the application experience of the different online application predicted by the prediction model and the application experience metrics obtained for the different online application.

7. The method as in claim 1, wherein obtaining the application experience metrics for the particular online application comprises:
    prompting users of the particular online application to rate their experiences with the particular online application.

8. The method as in claim 1, further comprising:
initiating an impairment test in the network to confirm whether the particular online application is behaviorally similar to any of the plurality of online applications.

9. The method as in claim 1, wherein the determination is based on whether the particular online application and any of the plurality of online applications react similarly to a certain type of impairment in the network.

10. The method as in claim 1, wherein the particular online application transmits video data via the network.

11. An apparatus, comprising:
one or more network interfaces;
a processor coupled to the one or more network interfaces and configured to execute one or more processes; and
a memory configured to store a process that is executable by the processor, the process when executed configured to:
identify a plurality of online applications accessible via a network for which a prediction model was trained to predict their application experiences;
make a determination as to whether a particular online application is behaviorally similar to any of the plurality of online applications;
obtain, based on the determination, application experience metrics for the particular online application, when the particular online application is not behaviorally similar to any of the plurality of online applications; and
train, using the application experience metrics for the particular online application, the prediction model to predict an application experience of the particular online application in addition to those of the plurality of online applications, when the particular online application is not behaviorally similar to any of the plurality of online applications.

12. The apparatus as in claim 11, wherein the process when executed is further configured to:
use the application experience of the particular online application predicted by the prediction model to make a routing decision with respect to traffic in the network associated with the particular online application.

13. The apparatus as in claim 11, wherein the apparatus makes the determination as to whether the particular online application is behaviorally similar to any of the plurality of online applications by:
computing mutual information metrics between telemetry data associated with the particular online application and telemetry data associated with each of the plurality of online applications.

14. The apparatus as in claim 13, wherein the telemetry data associated with the particular online application comprises both Layer 3 telemetry metrics collected from the network and Layer 7 telemetry metrics collected from the particular online application.

15. The apparatus as in claim 11, wherein the process when executed is further configured to:
use the prediction model to predict an application experience of a different online application than that of the particular online application and the plurality of online applications, based on a determination that the different online application is not behaviorally similar to that of the particular online application nor any of the plurality of online applications.

16. The apparatus as in claim 15, wherein the process when executed is further configured to:
train the prediction model to specifically predict the application experience of the different online application using application experience metrics obtained for the different online application, based on a difference between the application experience of the different online application predicted by the prediction model and the application experience metrics obtained for the different online application.

17. The apparatus as in claim 11, wherein the apparatus obtains the application experience metrics for the particular online application by:
prompting users of the particular online application to rate their experiences with the particular online application.

18. The apparatus as in claim 11, wherein the process when executed is further configured to:
initiate an impairment test in the network to confirm whether the particular online application is behaviorally similar to any of the plurality of online applications.

19. The apparatus as in claim 11, wherein the determination is based on whether the particular online application and any of the plurality of online applications react similarly to a certain type of impairment in the network.

20. A tangible, non-transitory, computer-readable medium storing program instructions that cause a device to execute a process comprising:
identifying, by the device, a plurality of online applications accessible via a network for which a prediction model was trained to predict their application experiences;
making, by a device, a determination as to whether a particular online application is behaviorally similar to any of the plurality of online applications;
obtaining, by the device and based on the determination, application experience metrics for the particular online application, when the particular online application is not behaviorally similar to any of the plurality of online applications; and
training, by the device and using the application experience metrics for the particular online application, the prediction model to predict an application experience of the particular online application in addition to those of the plurality of online applications, when the particular online application is not behaviorally similar to any of the plurality of online applications.

* * * * *

UNITED STATES PATENT AND TRADEMARK OFFICE
CERTIFICATE OF CORRECTION

PATENT NO. : 12,160,348 B1
APPLICATION NO. : 18/198553
DATED : December 3, 2024
INVENTOR(S) : Mukund Yelahanka Raghuprasad et al.

Page 1 of 1

It is certified that error appears in the above-identified patent and that said Letters Patent is hereby corrected as shown below:

In the Specification

Column 7, Line 59 please amend as shown:
core 402 and SD-WAN fabric 404. For instance, SD-WAN Column 9, Line 11 please amend as shown:
Modern SaaS solutions like Viptela, CloudonRamp SaaS, Column 9, Line 43 please amend as shown:
application telemetry (e.g., from routers 110a-110b, SD- Column 11, Line 33 please amend as shown:
ment of new labels. Generally, Domain Adaptation utilizes Signed and Sealed this
Eleventh Day of March, 2025

Coke Morgan Stewart
*Acting Director of the United States Patent and Trademark Office*